(12) United States Patent
Chiang et al.

(10) Patent No.: US 7,711,227 B2
(45) Date of Patent: May 4, 2010

(54) OPTICAL FIBER

(75) Inventors: Kin Seng Chiang, Kowloon (HK);
Vipul Rastogi, Uttar Pradesh (IN)

(73) Assignee: City University of Hong Kong,
Kowloon (HK)

( * ) Notice: Subject to any disclaimer, the term of this patent is extended or adjusted under 35 U.S.C. 154(b) by 0 days.

(21) Appl. No.: 11/532,192

(22) Filed: Sep. 15, 2006

(65) Prior Publication Data

US 2007/0147754 A1 Jun. 28, 2007

Related U.S. Application Data

(63) Continuation of application No. 10/316,972, filed on Dec. 11, 2002, now abandoned.

(51) Int. Cl.
*G02B 6/028* (2006.01)
(52) U.S. Cl. .................................... 385/124
(58) Field of Classification Search ............... 385/124
See application file for complete search history.

(56) References Cited

U.S. PATENT DOCUMENTS

| 4,185,890 A | 1/1980 | Onoda et al. |
| 4,610,506 A | 9/1986 | Tokunaga et al. |
| 2003/0044148 A1* | 3/2003 | Berkey et al. ............... 385/124 |
| 2003/0231847 A1* | 12/2003 | Varner et al. ................ 385/127 |

OTHER PUBLICATIONS

Birks, T.A., et al., "Endlessly Single-Mode Photonic Crystal Fiber", Optics Letters, Jul. 1, 1997, pp. 961-963, vol. 22, No. 13.
Lewotsky, Kristin, et al., "Optical Fiber", Laser Focus World, Dec. 1996, p. 16, 32(12).
Monroe, Tanya M., "Holey Fibers with Random Cladding Distributions", Optics Letters, Feb. 15, 2000, pp. 206-208, vol. 25, No. 4.
Optical Fiber Conference Proceedings, Mar. 1, 2002, pp. 620-621.
Rastogi, Vipul, et al., "Propagation Characteristics of a Segmented Cladding Fiber", Optics Letters, Apr. 15, 2001, pp. 491-493, vol. 26, No. 8.
Thyagarajan, K., et al., "Simple Numerical Technique for the Analysis of Cylindrically Symmetric Refractive-Index Profile Optical Fibers", Applied Optics, Sep. 20, 1991, pp. 3877-3879, vol. 30, No. 27.
Shizhuo, Yin, et al., "A New Design for Non-Zero Dispersion-Shifted Fiber (NZ-DSF) with a Large Effective Area Over 100 μm2 and Low Bending and Splice Loss", Optics Communications, Apr. 15, 2000, pp. 225-232, vol. 177.

* cited by examiner

*Primary Examiner*—Jerry T Rahll
(74) *Attorney, Agent, or Firm*—Fredrikson & Byron, P.A

(57) ABSTRACT

An optical fiber is described in which the cladding is provided with a refractive index that increases in a radially outward direction. In particular embodiments the refractive index of the cladding increases monotonically from a low value to a value close to or higher than the refractive index of the core. Such a fiber can be formed that can be operated in an effective single mode manner or in multimode operation and which is very suitable for use in high-bit-rate communication systems.

18 Claims, 4 Drawing Sheets

OPTICAL FIBER

RELATED APPLICATIONS

This is a continuation application of U.S. application Ser. No. 10/316,922 filed Dec. 11, 2002, now pending.

FIELD OF THE INVENTION

This invention relates to a novel design for an optical fiber, and in particular to designs for optical fibers that provide a large core single-mode fiber or multimode fiber for high capacity transmission.

BACKGROUND OF THE INVENTION

The most effective way of increasing the transmission capacity of an optical fiber communication system is to use the extremely wide bandwidth of a single-mode fiber and to feed a large number of channels as is practicable into the fiber. As a consequence of this, the trend has been to extend the communication window from the C-Band to the L-Band and the S-Band so that the communication window covers a total range of about 200 nm.

However, a major obstacle to the development of ultra-wide-band dense wavelength division multiplexing (DWDM) systems are non-linear effects, and in particular the Raman effect, which cannot be managed with dispersion. Non-Linear effects can cause distortion and crass-talk for example. A direct way to manage such non-linear effects is to use a single-mode fiber with a large effective core area, and therefore recently much work has been done on developing such fibers.

At the same time, there is an increasing interest in expanding the bandwidth of a multimode fiber to meet the demand for short-distance broadband applications, such as broadband Internet and local-area networks. For such applications, the very large core size of a multimode fiber proves to be important because it can ease the optical alignment and lower the fiber connection cost (and hence the system cost). Unfortunately the bandwidth of a conventional step-index multimode fiber, especially a large-core multimode fiber, is very limited and cannot meet future, demand. It is desirable to design a multimode fiber that has a very large core size yet provides a sufficiently large bandwidth.

PRIOR ART

The effective core area of a conventional dispersion-shifted single-mode fiber is about 50 $\mu m^2$. In 1996 Corning Inc. developed a large-effective-area dispersion-shifted fiber (LEAF) which had an effective core area of about 80 $\mu m^2$, and there are other designs for large-effective-area fibers, one of which shows an effective area of about 100 $\mu m^2$, A single material photonic crystal fiber, a so-called holey fiber, is characterized by a distribution of air holes in the cladding running through the entire length of the cladding and has attracted considerable attention in recent years because it is capable of single-mode operation over a wide range of wavelengths. However, it is difficult to keep the birefringence, and hence the polarization mode dispersion in the fiber, low because of the large index contrast introduced by the air holes.

The core area of a commercial multimode fiber is of the order of 1000-100000 $\mu m^2$. The bandwidth problem is solved by introduction of a suitable graded refractive-index profile in the core of the fiber. However, to obtain a bandwidth that is much wider than that of a step-index fiber of the same core size, air accurate control of the profile shape in the core is required, which is difficult to achieve, especially when the core is very large.

SUMMARY OF THE INVENTION

According to the present invention there is provided an optical fiber comprising a central step-index or graded-index core region surrounded by an annular cladding regions wherein said cladding region is formed with a refractive index that increases in a radially; outward direction.

An advantage of the present invention, at least in preferred forms, is that the size of the core region can be small enough to guarantee effective single-mode operation, or large-enough to provide effective multimode operation.

Preferably the refractive index of the cladding region increases from a low value to a value close to or greater than the peak refractive index in the core region.

In preferred embodiments of the invention the refractive index of the cladding region increases monotonically. For example, in accordance with a power law, or alternatively, the refractive index of said cladding region may increase in a step-like manner.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

As will be seen from the following, the present invention provides, at least in its preferred forms, an optical fiber with a cladding refractive-index profile that increases monotonically away from the center in the radial direction. The advantage of this structure is that it is possible to provide a fiber with an effective single-mode operation at a desired wavelength (e.g. 1550 nm communication window) with a very large effective mode area. A radially rising cladding profile makes the fiber essentially a leaky structure. An appropriate choice of the cladding profile causes the first higher-order mode of the fiber to leak away very quickly while offering a very low leakage loss to tale fundamental mode. The fiber, thus, stays effectively single-moded even with a very large core size.

Figure 1:
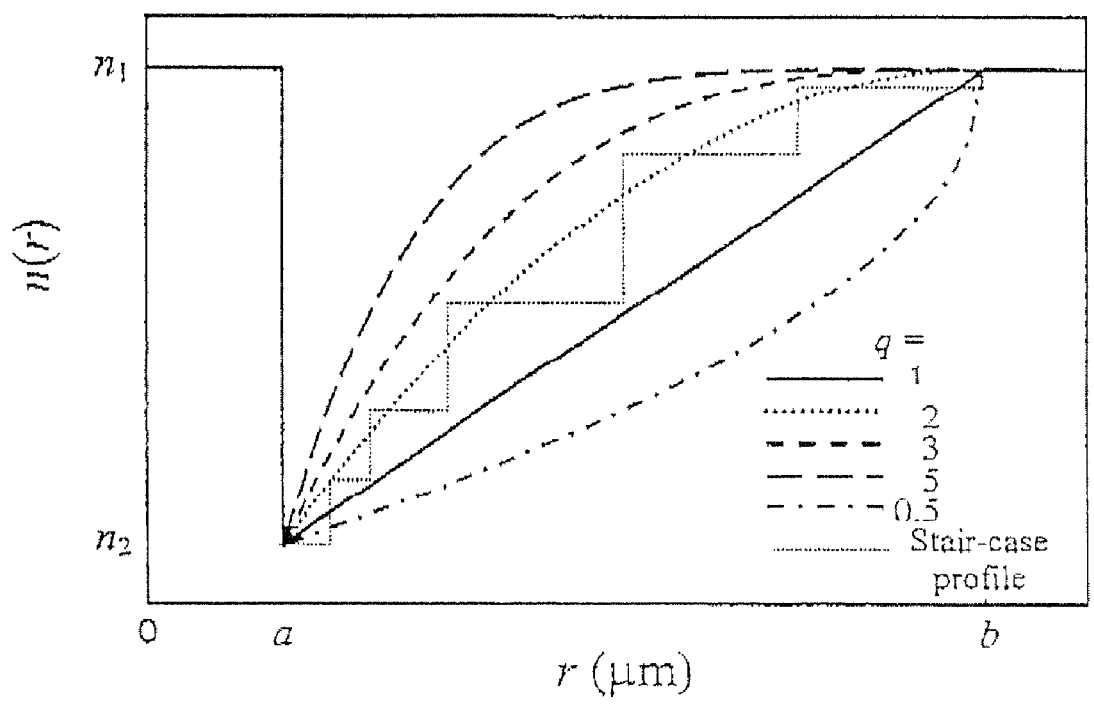
FIG. 1 is a plot showing a selection of possible refractive-index profiles for fibers in accordance with embodiments of the invention.

FIG. 1 shows some typical refractive-index profiles for fibers according to embodiments of this invention with the refractive index increasing monotonically. In practice, however, the manufacture of a fiber with a smoothly increasing refractive index may not always be straightforward, and instead the refractive-index may increase in a step-like manner, and therefore FIG. 1 also includes such a stair-case profile. Where the refractive-index increases in a step-like manner the number of steps can be varied, and it is not necessary for each step to be the same height or the same length. The number of steps, their length and their height can be varied as desired to approximate a smoothly-increasing profile.

The refractive-index distribution profile in the cladding can be of any shape (possibilities include exponential and Gaussian profiles in addition to the following examples), provided that it increases in the radially outward direction from a low value to a value that is close to or larger than the peak index in the core. For illustrative purposes, in some embodiments of the invention, the refractive-index distribution can be expressed as $$n^2(r) = n_1^2 \qquad r < a \text{ and } r > b \qquad (1)$$

$$n^2(r) = n_1^2 \left[ 1 - 2\Delta \left( \frac{\frac{b}{a} - \frac{r}{a}}{\frac{b}{a} - 1} \right)^q \right] \qquad a < r < b$$

where the region r<a represents the core and the region a<r<b represents the cladding of the fiber. The cladding of the fiber is truncated at r=b, beyond which there is a high-index region $n_1$. The profile in the core (r<a) or outside the cladding (r>b) may either be graded-index or step index. For simplicity, a step-index profile may be chosen in these regions. The profile in the cladding is a power-law profile with profile shape parameter q.

$$\Delta = \frac{n_1^2 - n_2^2}{2n_1^2}$$

is the relative core-cladding index difference with $n_2$ being the minimum value of the cladding index.

The fiber can be characterized by using the normalized parameters $$V = \frac{2\pi}{\lambda} a n_1 \sqrt{2\Delta},$$

which is the normalized frequency, and $$B = \frac{n_{eff}^2 - n_2^2}{n_1^2 - n_2^2},$$

the normalized propagation constant, where $n_{eff}$ is the mode index. Since the fiber is a leaky structure, B is complex, whose real part $B_r$ gives the value of the mode index and imaginary part $B_i$ measures the leakage loss. The actual leakage loss of the fiber can be calculated from $B_i$ by $$\alpha = 8.686 \times 10^{12} \frac{2\pi}{\lambda} n_1 \Delta B_1$$

in dB/km, where λ is the free-space optical wavelength in nm.

Figure 2:
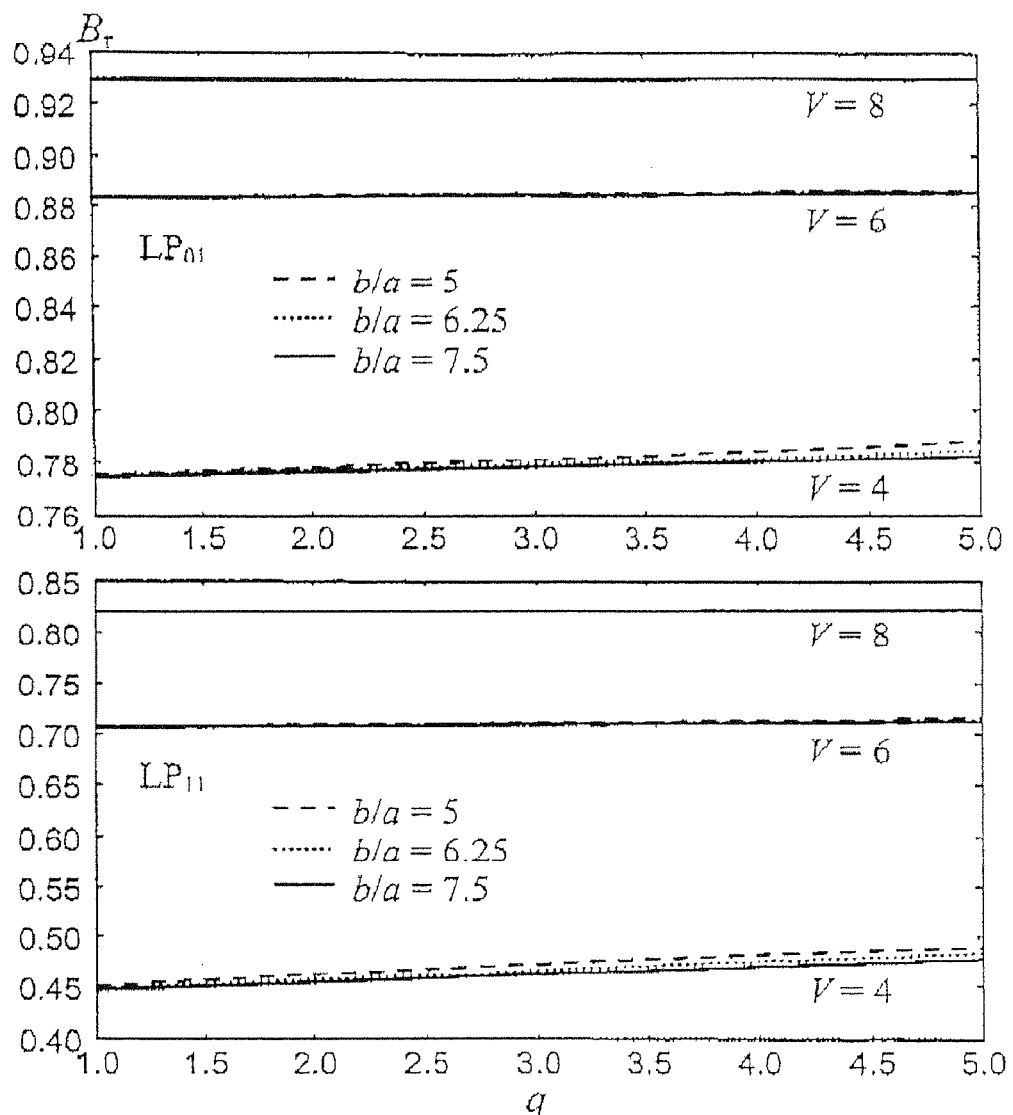
FIG. 2 shows the effects the profile parameter and the cladding-core radius ratio on the real pan of the normalized propagation constant for fibers in accordance with embodiments of the invention.
Figure 3:
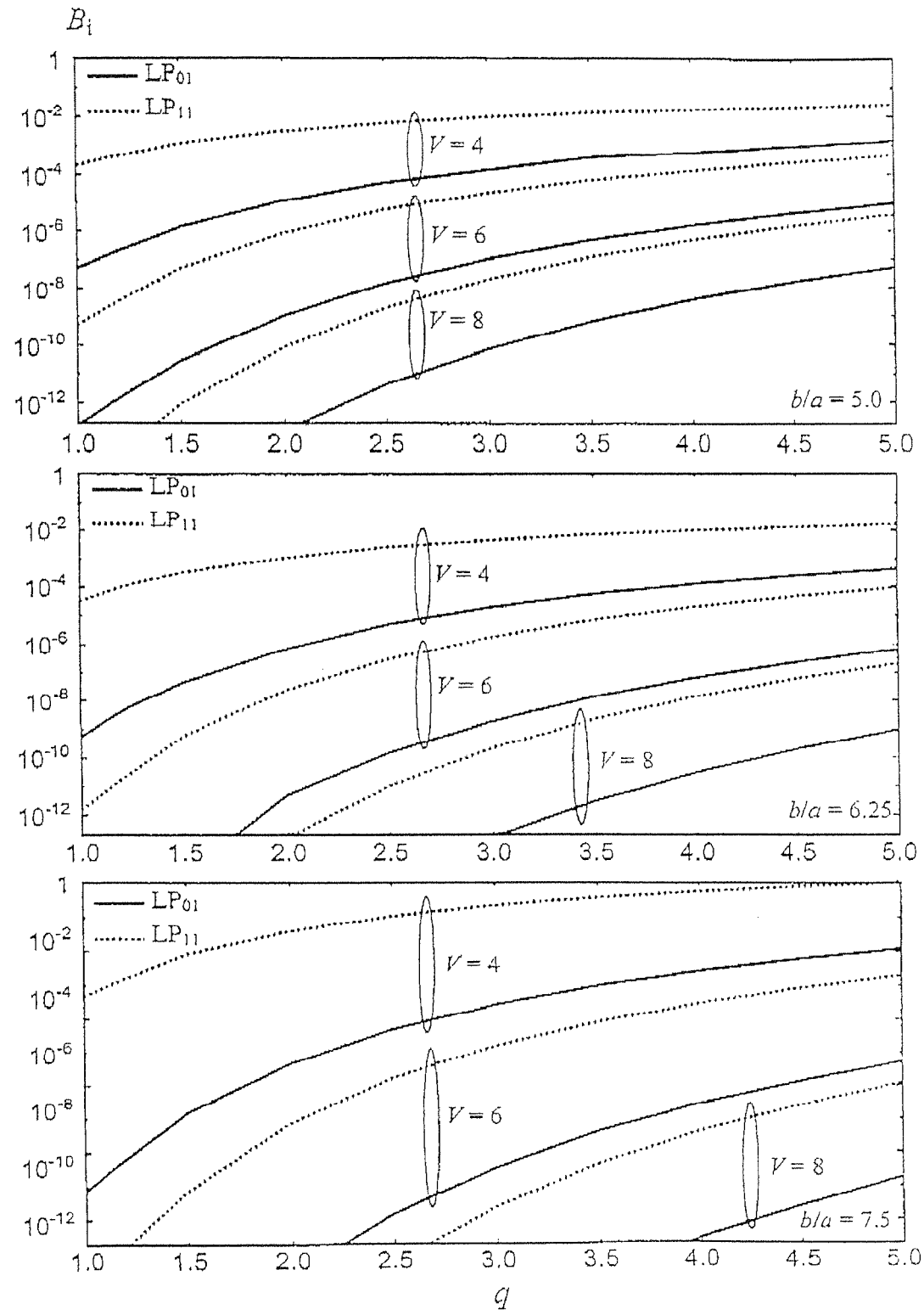
FIG. 3 shows the effects of the profile parameter on the loss of the fundamental mode and the first higher-order mode.

Fibers according to embodiments of the invention may be analysed using the matrix method described by K. Thyagarajan, S. Diggavi, A. Taneja, aid A. K. Ghatak, *Appl. Opt.* 30 (1991) 3877 and show in FIG. 2 and FIG. 3 are the $B_r$ and $B_i$ of the $LP_{01}$ and $LP_{11}$ modes as a function of the profile parameter q for different values of V and b/a. FIG. 2 shows that the effective index of the node is hardly affected by the profile shape parameter q. The value of b/a also has little effect on $B_r$. It can also be seen that the values of $B_r$ for a given V are very close to those of the corresponding step-index fiber. The fact that the radially rising profile in the cladding does not greatly affect the effective indices of the modes indicates the possibility of tailoring the chromatic dispersion characteristics of the fiber with a suitable refractive-index profile in the core, as in conventional fiber designs.

On the other hand, the radially rising profile in the cladding has a significant effect on the leakage loss of the modes, as shown in FIG. 3. It can be seen that even for a large V (much higher than the single-mode limit 2.4048 of a conventional step-index fiber), with an appropriate choice of the cladding profile, the leakage loss of the fundamental mode can stay very low while that of the first higher-order mode is orders of magnitude higher. The fiber, thus, shows effective single-mode operation. It can also be seen that for a given profile q, an increase in b/a increases the ratio of the leakage loss of the $LP_{11}$ mode to that of the $LP_{01}$ mode by orders of magnitudes. For example, this ratio for q=1 and V=4 increases from $10^4$ to $10^5$ when b/a is increased from 5.0 to 6.25, and to $10^6$ for b/a=7.5, clearly distinguishing the two modes in terms of guidance. A very large V value or a very low q value results in a very low loss even for the $LP_{11}$ mode. Therefore, the values of V and q should be chosen to give a sufficiently high leakage loss for the $LP_{11}$ mode and, at the same time, a sufficiently low loss for the $LP_{01}$ mode.

To provide an estimate of the practical values of the leakage losses, we consider a silica fiber with Δ=0.0023. The loss of this fiber at 1550 nm terms of $B_i$ is given as $\alpha=1.17 \times 10^8 B_i$ in dB/km. Therefore, in a silica fiber with q=4.0, a=20 μm (an effective core area of ~1000 μm²), and b=100 μm, which correspond to V=8 and b/a=5, for the $LP_{01}$ node with $B_i=3.7 \times 10^{-9}$, the leakage loss is as small as 0.43 dB/km, while for the $LP_{11}$ mode with $B_i=4.6 \times 10^{-7}$, the leakage loss is as large as 54 dB/km. The fiber is practically a single-made fiber.

For a typical silica fiber with core radius 10 μm (an effective core area of ~200 μm²) cladding radius 62.5 μm, and a radially rising stair-case profile, the leakage losses at the wavelength 1550 nm are 0.06 dB/km and 2000 dB/km for the fundamental mode and the first higher-order mode, respectively, and the fundamental mode has a Gaussian-like mode pattern of a conventional step-index fiber. It should be mentioned here that it is possible to design a fiber to give a much larger mode area, but bending lost limits the maximum mode area that cant be achieved in practice.

The same design as shown in FIG. 1 can be used to provide multimode operation with a wide bandwidth. By increasing the core radius or the index contrast sufficiently (e.g., a=100 μm and Δ=0.01), the value of V can become very large (V>>1) and the number of modes in the fiber increases at a rate proportional to the square of V. As implied by the results in FIG. 3, the leakage loss increases generally with the mode order. Therefore, a leakage lose distribution can be defined, which is a function that characterizes how the leakage loss varies with the mode order. Obviously, the form of the leakage loss distribution depends on the refractive-index profile of the cladding. In general, a higher-order mode, because of its larger leakage loss, leaks out from the fiber at a shorter distance than a lower-order mode. The fiber thus has the effect of stripping off the modes continuously along the transmission distance, starting from the modes of the highest orders. In other words, the effective number of modes propagating in the fiber decreases as the length of the fiber increases. This is equivalent to say, using the concept of geometric optics, that the effective numerical aperture of the fiber decreases as the length of the fiber increases because of the leakage mechanism. By reducing the effective, numerical aperture (through gradual elimination of higher-order modes), the bandwidth-length product of the fiber increases with the length of the fiber.

Figure 4:
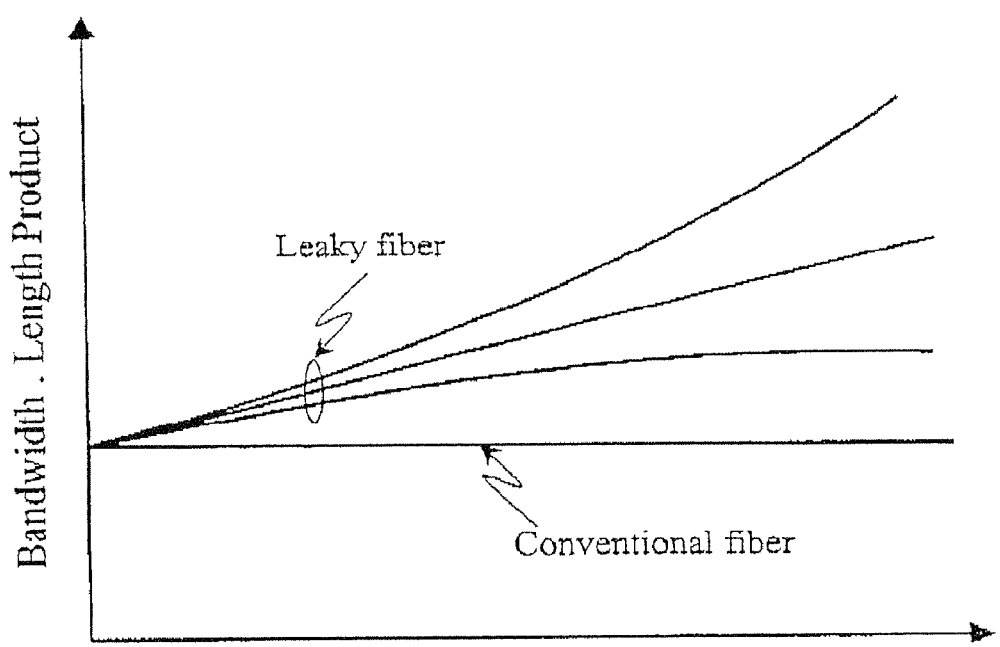
FIG. 4 is a comparison of the bandwidth-length product of a conventional fiber with fibers according to embodiments of the present invention.

On the other hand, the bandwidth-length product of a conventional multimode fiber, which has a uniform cladding, is a constant, which is equal to the initial bandwidth-length of the corresponding leaky fiber, as shown in FIG. 4. For the leaky fiber, the dependence of the bandwidth-length product on the fiber length is governed by the refractive-index profile of the cladding. It is possible to obtain a linear dependence by using a suitable index profile. In that case, the bandwidth (not the bandwidth-length product) of the fiber becomes a constant, which implies that the fiber can promise the same bandwidth regardless of its length.

It should be pointed out that the leaky multimode fiber is inherently more lossy than the conventional multimode fiber. The gain in bandwidth is traded with an increase in optical loss. The leaky fiber is therefore most suitable for short-distance position applications where the transmission distance is limited bug the dispersion instead of the attenuation in the fiber.

The present invention, at least in its preferred forms, provides a fiber that is easy to fabricate with the existing well-established technology for making graded-index fibers and should be very useful for high-bit-rate communication systems.

The invention claimed is:

1. An optical fiber comprising a central step-index or graded-index core region surrounded by an annular cladding, wherein said cladding is formed with a refractive index that increases in a radially outward direction, wherein the refractive index increases from a low value to a value close to or greater than the peak refractive index in the core region, wherein the annular cladding allows at least a first higher-order mode to leak out from the fiber.

2. An optical fiber as claimed in claim 1 wherein said refractive index of said cladding increases monotonically.

3. An optical fiber as claimed in claim 1 wherein said refractive index of said cladding increases in a step-like manner.

4. An optical fiber as claimed in claim 1 wherein said refractive index of said cladding increases in accordance with a power law, wherein:

$$n^2(r) = n_1^2 \left[ 1 - 2\Delta \left( \frac{\frac{b}{a} - \frac{r}{a}}{\frac{b}{a} - 1} \right)^q \right]$$

where n (r)=the refractive index at a radius r
$n_1$=the refractive index in the core
$n_2$=the refractive index at radius a
a=the radius of the core
b=the radius of the cladding, and
q=the profile shape parameter (q>0), and $$\Delta = \frac{n_1^2 - n_2^2}{2n_1^2}.$$

5. An optical fiber as claimed in claim 1 wherein the refractive index of said cladding increases exponentially or in a Gaussian manner.

6. An optical fiber as claimed in claim 1 wherein said fiber is adapted to be operated in effective single-mode operation.

7. An optical fiber as claimed in claim 1 wherein said fiber is adapted to be operated in effective multimode operation.

8. An optical fiber as claimed in claim 1 wherein the refractive index of the cladding increases from the low value at an innermost radius of the cladding to the value close to or greater than the peak refractive index in the core region at an outermost radius of the cladding.

9. An optical fiber as claimed in claim 8 wherein the low value comprises a minimum refractive index value of the cladding and the value close to or greater than the peak refractive index in the core region comprises a maximum refractive index value of the cladding.

10. An optical fiber as claimed in claim 8 wherein the cladding further comprises an inner radius located between the innermost radius of the cladding and the outermost radius of the cladding, wherein location of the cladding inner radius corresponds to a profile shape parameter of the cladding.

11. An optical fiber as claimed in claim 10 wherein the profile shape parameter comprises a slope of the profile shape of the cladding.

12. An optical fiber as claimed in claim 10 wherein the cladding inner radius has a corresponding refractive index, the corresponding refractive index corresponding to a relative index difference between the peak refractive index in the core region and the low value of the refractive index of the cladding.

13. A method of transmitting data through an optical fiber, comprising providing a fiber having a central step-index or graded-index core region surrounded by an annular cladding, wherein said cladding is formed with a refractive index that increases in a radially outward direction, wherein the refractive index increases from a low value to a value close to or greater than the peak refractive index in the core region, wherein the annular cladding allows at least a first higher-order mode to leak out from the fiber, and operating said fiber in an effective single-mode manner.

14. The method of claim 13 wherein the refractive index of the cladding increases from the low value at an innermost radius of the cladding to the value close to or greater than the peak refractive index in the core region at an outermost radius of the cladding.

15. The method of claim 14 wherein the low value comprises a minimum refractive index value of the cladding and the value close to or greater than the peak refractive index in the core region comprises a maximum refractive index value of the cladding.

16. A method of transmitting data through an optical fiber, comprising providing a fiber having a central step-index or grade-index core region surrounded by an annular cladding, wherein said cladding is formed with a refractive index that increases in a radially outward direction, wherein the refractive index increases from a low value to a value close to or greater than the peak refractive index in the core region, wherein the annular cladding allows at least a first higher-order mode to leak out from the fiber, and operating said fiber in a multimode manner.

17. The method of claim 16 wherein the refractive index of the cladding increases from the low value at an innermost radius of the cladding to the value close to or greater than the peak refractive index in the core region at an outermost radius of the cladding.

18. The method of claim 17 wherein the low value comprises a minimum refractive index value of the cladding and the value close to or greater than the peak refractive index in the core region comprises a maximum refractive index value of the cladding.

* * * * *

UNITED STATES PATENT AND TRADEMARK OFFICE
CERTIFICATE OF CORRECTION

| | | |
|---|---|---|
| PATENT NO. | : 7,711,227 B2 | |
| APPLICATION NO. | : 11/532192 | |
| DATED | : May 4, 2010 | |
| INVENTOR(S) | : Kin Seng Chiang and Vipul Rastogi | |

It is certified that error appears in the above-identified patent and that said Letters Patent is hereby corrected as shown below:

RELATED APPLICATIONS

Column 1, line 6, please delete "10/316,922" and replace with --10/316,972--.

Signed and Sealed this
First Day of May, 2012

David J. Kappos
*Director of the United States Patent and Trademark Office*